United States Patent
Huetteman et al.

[19]

[11] Patent Number: 5,960,721
[45] Date of Patent: Oct. 5, 1999

[54] COMPOSITE WOOD AND POLYMER FORKLIFT PALLET ASSEMBLY AND METHOD

[75] Inventors: Richard J. Huetteman, Hillsborough; Michael J. Barron; Randall K. Brown, both of San Francisco, all of Calif.

[73] Assignee: Teh Marathon Pallet Trust, Alameda Point, Calif.

[21] Appl. No.: 09/082,416

[22] Filed: May 20, 1998

[51] Int. Cl.⁶ .................................................. B65D 19/38
[52] U.S. Cl. ..................................... 108/57.17; 108/57.21
[58] Field of Search ............................. 108/57.12, 57.33, 108/57.21, 51.11, 901, 56.3, 56.1; 206/386, 596, 598

[56] References Cited

U.S. PATENT DOCUMENTS

| | | | |
|---|---|---|---|
| 1,696,585 | 12/1928 | Shepard, Jr. et al. | 108/57.21 |
| 2,503,022 | 4/1950 | Benoist et al. | 108/56.1 |
| 3,126,843 | 3/1964 | De Laney . | |
| 3,628,468 | 12/1971 | Angelbeck, Jr. . | |
| 4,145,975 | 3/1979 | Colbert . | |
| 4,159,681 | 7/1979 | Vandament . | |
| 4,397,247 | 8/1983 | Lemelson . | |
| 5,052,307 | 10/1991 | Morrison . | |
| 5,123,359 | 6/1992 | DelBalso . | |
| 5,673,629 | 10/1997 | Ginnow | 108/57.17 |
| 5,676,063 | 10/1997 | Wallace | 108/57.17 |

OTHER PUBLICATIONS

Engineered Polymers Corp. advertisement regarding Penda WeightLifter and EnviroPal pallets and Structo–Cell pallets, 3 pp.

*Primary Examiner*—Peter M. Cuomo
*Assistant Examiner*—Terry A. Anderson
*Attorney, Agent, or Firm*—Flehr Hohbach Test Albritton & Herbert LLP

[57] ABSTRACT

A pallet assembly (21, 51, 71) including a plurality of side-by-side rail assemblies (22–24, 56–58, 72–74), a wooden deck (26, 52, 84) secured to an upwardly facing side of the rails and extending transversely thereacross, and an impact-resistant polymer deck boards (31, 53, 83) secured to the leading edges of the rails to define the tine-receiving channels (28, 29, 61, 62, 86, 87) of the pallet assembly. The rails preferably are also formed of a high-impact resistant polymer members or are provided for by polymer end caps (77, 78) on the end of wooden members (76). A wooden rail (76) and polymer end caps (77, 78) subassembly is included, as is a method for forming a composite wood and polymer pallet assembly.

17 Claims, 6 Drawing Sheets

COMPOSITE WOOD AND POLYMER FORKLIFT PALLET ASSEMBLY AND METHOD

TECHNICAL FIELD

The present invention relates, in general, to forklift truck pallet assemblies, and more particularly, relates to forklift pallet assemblies which contain both wood and polymer or plastic members.

BACKGROUND ART

Wooden pallet assemblies have been in use for many years in connection with the transportation and storage of a wide variety of products. Palletized loads are typically lifted using a forklift truck or pallet jack and they are moved within storage facilities and to and from transport vehicles, such as trucks, trains and ships.

A typical wooden pallet may support 2,000 to 3,000 pounds of stacked product in the form of boxes, bags or other stackable articles. Since a premium is placed on the rapid movement of palletized loads, forklift operators are under considerable pressure to rapidly insert the forklift tines underneath the pallet, lift the pallet, move it to a desired new location, and disengage from the pallet. This process predictably results in numerous impact loads and high stresses on the wooden members which form the pallet assembly. Similarly, pallet jacks, which include lifting tines and a manually operated hydraulic system, also are rapidly inserted under the pallet and used to lift it so that the operator can manually move the pallet assembly when a forklift truck is not available.

Since there are millions of forklift pallet assemblies in use at any time, and the rapid engagement and disengagement of these pallets by the forklift trucks and pallet jacks causes considerable pallet damage. Splitting of the deck members on the pallet, as well as the longitudinal rails, occurs regularly. In fact, the normal life of a conventional wooden pallet will typically be about three to five round trips or cycles, depending on the care of the forklift operators. A round trip or cycle will be comprised of loading the pallet at a supply center with product, moving the pallet onto a transport vehicle, unloading the pallet from the vehicle at the destination, storing the pallet until the product is used and then returning the unloaded pallet back to the supply center.

Accordingly, in recent years, attempts have been made to manufacture forklift pallet assemblies from polymer or plastic materials which would be less likely to fail under the severe handling conditions which destroy wooden pallets. Typical of plastic forklift pallet assemblies which are currently on the market are the pallets manufactured by Menasha Corporation of Watertown, Wisconsin and the STRUCTO-CELL pallet manufactured by Engineered Polymers Corporation of Mora, Minn.

All plastic pallet assemblies, however, have substantial disadvantages. The plastic pallet often lacks sufficient strength unless it is molded into relatively complex configurations. There is a tendency for plastic to droop under load, particularly when stored on pallet racks, and plastic pallet assemblies are much heavier than wooden assemblies. Another significant disadvantage of plastic pallet assemblies is that the plastic provides a low coefficient of friction. Thus, the plastic load-supporting deck will allow bags, boxes and the like to slide along and even off the plastic deck. When a pallet is tilted or brought to a jarring stop as part of the handling procedure, which often occurs, the load can shift on plastic pallets, whereas it generally will remain substantially in place on a wooden pallet. Plastic forklift pallet assemblies also are more costly to manufacture, although they can have a resulting increased pallet life.

Attempts have been made to overcome the strength and dimensional stability problems associated with polymer or plastic pallets by incorporating wooden members into the polymer structure in order to rigidify the same. Thus, composite wood and polymer pallets have been designed in which wooden members are used as longitudinally or transversely extending strengthening rails in the polymer pallet. Typical of such structures are the pallets shown in U.S. Pat. Nos. 5,123,359, 5,052,307, 4,397,247, 4,145,975 and 3,628,468. All of these pallet assemblies, however, have load-supporting deck surfaces which are plastic. Thus, they suffer from the substantial disadvantage that the coefficient of friction between the load and the load-supporting deck is undesirably low. As can be seen in some of these assemblies, such as the pallets of U.S. Pat. Nos. 5,052,307 and 3,628,468, this problem is attempted to be overcome by providing a rib or a small lip at the edge of the pallet.

In U.S. Pat. No. 4,159,681 a forklift pallet assembly is constructed in which wooden members are used to contain a plastic foam. The pallet also includes a rigidifying arched or flexed wooden member in the pallet core. The cost of fabricating such pallets is undesirably high.

Finally, U.S. Pat. No. 3,126,843 discloses a composite polymer or plastic and wood pallet assembly in which wooden deck members are adhesively secured to longitudinally extending plastic rails. The pallet assembly also includes a container adhesively secured to the rails in lieu of the wooden deck members. Again, however, the wooden deck members of U.S. Pat. No. 3,126,843 are exposed to tines and lifting mechanism of both the forklift truck and the pallet jack. Over 90 percent of the damage done to wooden pallets is to the lead deck boards and ends of the rails. The pallet assembly of U.S. Pat. No. 3,126,843, therefore, also will rapidly become damaged under normal handling conditions.

Accordingly, it is an object of the present invention to provide a pallet assembly and method which provides a pallet having greatly increased durability and strength.

Another object of the present invention is to provide a pallet assembly for a forklift truck or the like which has a load-supporting surface that provides sufficient friction to maintain the palletized load in substantially the same position during normal pallet handling.

A further object of the present invention is to provide a composite wood and polymer forklift pallet assembly which can resist impact loading, has a greatly increased useful life, requires fewer repairs can be constructed using automatic equipment at a reasonable cost, can be made from recycled polymers which can be recycled again, is well suited for rack storage, and will cost less per use cycle.

The composite wood and polymer pallet assembly and method of the present invention have other features and advantages which will become apparent from, and are set forth in more detail in, the accompanying drawing and following description of the Best Mode Of Carrying Out The Invention.

DISCLOSURE OF INVENTION

The pallet assembly of the present invention comprises, briefly, a plurality of side-by-side spaced apart rails extending from a front to a rear of the pallet, a wooden deck secured to an upwardly facing side of the rails and extending transversely across the rails to provide a wooden load support surface, and an impact resistant polymer deck boards secured to the rails at at least one of the front and rear leading edges of the pallet assembly outwardly of the wooden deck so as to shield the wooden deck from direct impact from a lifting device during lifting of the pallet assembly. In the preferred form, the side-by-side rails also are formed of a polymer or have polymer end caps of sufficient thickness so as to be resistant to impact loading by the forklift truck or pallet jack. Moreover, in the preferred form, the polymer deck boards at the leading edges of the pallet have a thickness slightly less than the thickness of the wooden boards comprising the deck so as to insure that the load is supported on and frictionally engaged by, the wooden deck.

In another aspect of the present invention, a rail assembly for a pallet is provided which is comprised of a wooden rail having polymer end caps.

In still a further aspect, a method for forming a pallet assembly is provided which is comprised, briefly, of the steps of securing a wooden deck to an to an upwardly facing side of a plurality of side-by-side rails, mounting an impact-resistant polymer deck board to the upwardly facing side of the rails at leading edges of opposite ends of the pallet assembly. Most preferably the securing and mounting steps are accomplished by mounting the deck to polymer rail assemblies.

BEST MODE OF CARRYING OUT THE INVENTION

Figure 1:
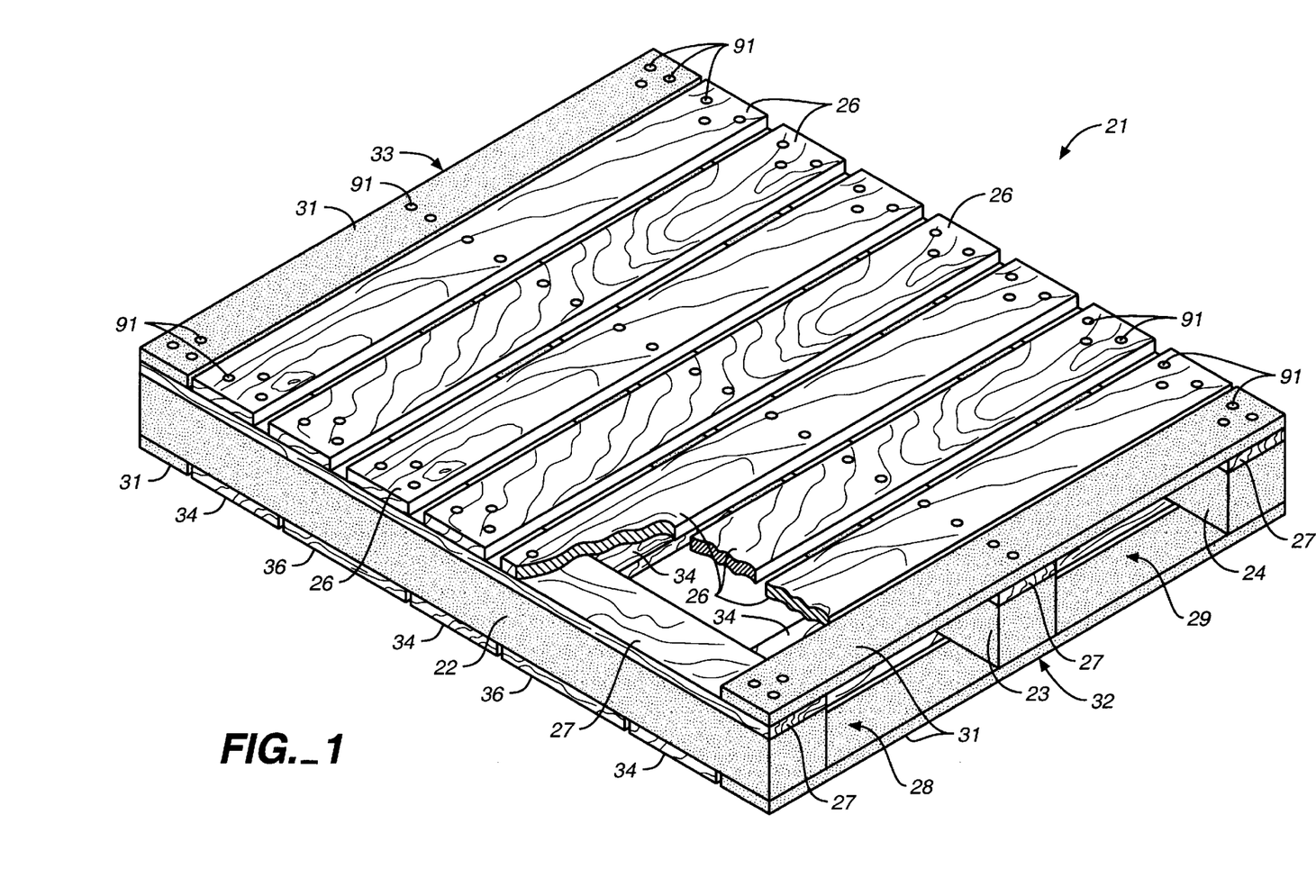
FIG. 1 is a top perspective view of a pallet assembly constructed in accordance with the present invention.
Figure 2:
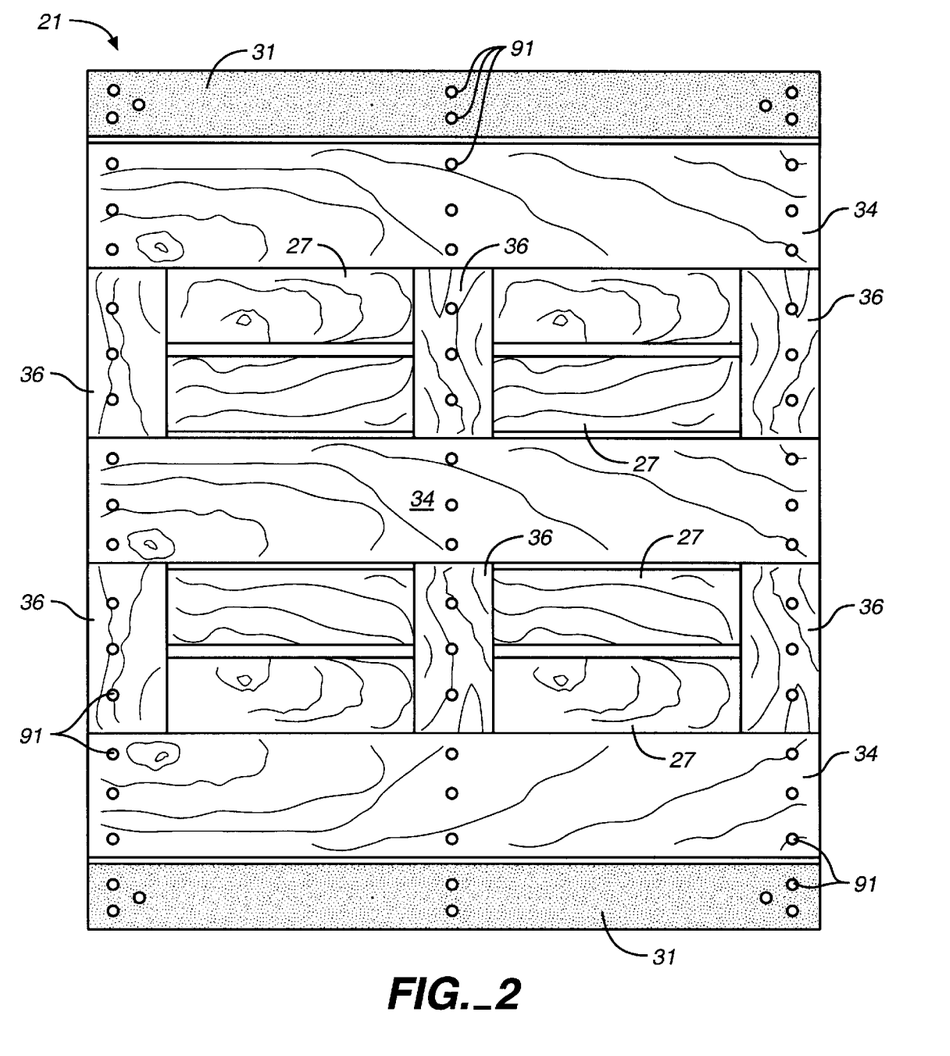
FIG. 2 is a bottom plan view of the pallet assembly of FIG. 1.

Referring now to FIGS. 1 and 2, a composite wood and polymer pallet assembly, generally designated 21, is shown. Pallet 21 includes a plurality of side-by-side, spaced apart rail assemblies 22, 23 and 24. Most typically, pallet assembly 21 will be elongated in the direction of rails 22–24, but it can also be constructed to be square pallet or even shorter in the fore-and-aft direction of the rails than transversely thereto. The designations "front," "rear" and "sides," therefore, are primarily for the sake of convenience of discussion. Moreover, as used throughout the drawing, polymeric components in the preferred embodiments have been illustrated as being stippled, while wooden components are shown with a wood grain.

Mounted on upwardly facing sides of rail assemblies 22, 23 and 24 is an upper wooden deck, in this case, formed by a plurality of wooden deck boards or members 26 and polymer deck boards 31. The wooden deck members 26 provide an upwardly facing, wooden, load-support surface which has a coefficient of friction, with the load to be supported on the pallet, that is sufficiently high so as to prevent load shifting during normal pallet handling. Thus, tilting of the pallet during lifting and placement, as well as quick starts and stops of the forklift truck or pallet jack, will not normally cause sliding of the load on wooden deck members 26.

In the pallet assembly of the present invention, greatly improved useful pallet life is achieved by using impact-resistant polymer deck boards 31 at at least one of the front and rear or leading edges of the pallet assembly. As shown in FIG. 1, polymer deck boards 31 are provided at both the front end 32 and the rear end 33 of pallet 21, and polymer deck boards 31 are secured to both the upwardly facing sides of rail assemblies 22, 23 and 24, as well as the downwardly facing sides of the rail assemblies.

As used herein, "polymer" shall include both plastic and synthetic rubber materials, which have resistance to impact loading and sufficient stiffness or rigidity to enable their use as load-bearing structural members. The most preferred polymer for use in the pallet assembly of the present invention is high density polyethylene. The polyethylene can be recycled and it can be extended with up to 30 percent by volume of wood particles. Other plastics and stiffened synthetic rubbers are also suitable, but may have cost disadvantages as compared to polyethylene.

As can be seen in FIG. 1, therefore, the front end 32 of pallet 21 has tine-entry channels 28 and 29 which are defined by upper and lower plastic impact boards 31 and the ends of rail assemblies 22, 23 and 24. Rail assemblies 22, 23 and 24 have a height dimension sufficient to enable the tines of the lifting device to pass under the upper deck members 26 and 31 so that the pallet can be lifted with the load supported on the deck. Rail assemblies 22, 23 and 24 can be wooden but in order to further reduce damage from impact loading, the most preferred form of the rail assembles is for at least the ends thereof, and advantageously the entire rail, to be formed of a polymer material. As shown in FIG. 1, therefore, rail assemblies 22, 23 and 24 preferably are polymer members, but they also have longitudinally extending wooden rail boards 27 mounted on the upper surfaces thereof underneath deck members 26 and 31. Rail boards 27 provide several important advantages for pallet assembly 21. First, they combine with polymer rails to define channels 28 and 29 in the front and rear of the pallet which will receive the lifting tines. Most typically, the vertical height of tine-receiving channels 28 and 29 will be about three and three-quarter inches, although other combined heights of the polymer rails and rail boards may also be used. Second, rail boards 27 increase the longitudinal rigidity of the polymer rails 22, 23 and 24. The wood and polymer composite structure of the rail assemblies reduces their longitudinal flexing about a transverse horizontal axis. Finally, rail boards 27 provide a manufacturing advantage in that they facilitate nailing of deck boards 26 and 31 to the polymer rail members using automatic nailing equipment, in a manner which will be described in more detail below.

As can be seen from FIG. 1, therefore, the only wooden member which can be engaged as the forklift tines enter channels 28 and 29 would be the relatively thin rail boards 27, and the likelihood of directly impacting these boards, which are each sandwiched between plastic members, is very small. Thus, as the tines of the lifting device enter channels 28 and 29 at the front or rear of the pallet, any misalignments will result in the ends of the tines hitting polymeric components of the pallet, rather than easily split or damaged wooden components. Nevertheless, the load-supporting surface of pallet 21 is provided substantially entirely by a high-friction, low-weight and wooden decking.

While it is possible to form a pallet which has an upper deck only, most forklift pallet assemblies include a lower deck or at least lower bracing members. As can be seen in FIG. 2, therefore, the bottom of pallet assembly 21 can include a plurality of transverse bracing members 34, which most preferably are provided by wooden members in order to reduce the cost and weight of the pallet assembly. Moreover, in order to insure level stacking on the top of other loads or pallet racks, longitudinally extending, lower wooden, rail boards 36 can be provided so that the combined lower deck is comprised of plastic impact boards 31, transverse wooden bracing boards 34 and longitudinal wooden rail boards 36, all of which are in substantially the same plane to provide a stable surface for support of the pallet. The lower deck need not have transverse deck members 34 which are as close together as the upper deck boards 26, although close spacing of transverse members also possible in lieu of using longitudinal rail boards 36.

In order that the load will be supported on upper deck boards 26 and not on low friction polymer deck boards 31, it is most preferable that the impact-resistant polymer boards 31 have a thickness dimension which is less than the thickness dimension of wooden deck boards 26. This can best be seen in FIG. 3, wherein a gap or space 37 can be seen to exist between bottom surface 38 of a load 39 supported on deck boards 26 and the upper surface 41 of polymer impact board 31. A similar gap 37 can be provided at the lower deck so that the pallet is supported on a support surface 42 with the impact board 31 out of engagement with the support surface. This structure insures, for example, that the leading edge impact boards 31 do not lift the load 39 off of the wooden decking or lift the pallet 21 off of support surface 42.

Figure 3:
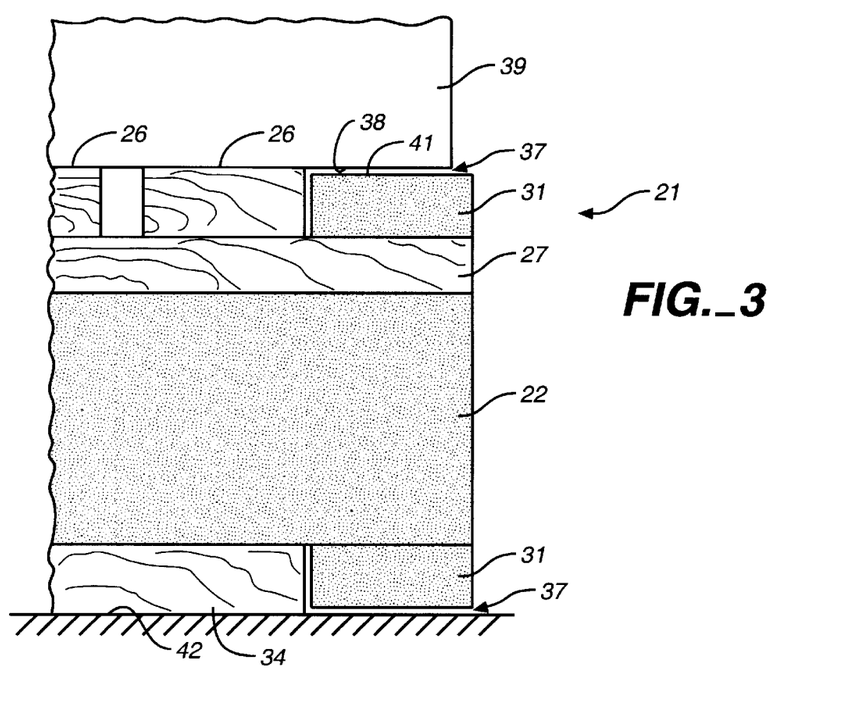
FIG. 3 is an enlarged, fragmentary, side elevation view of the pallet assembly of FIG. 1.

Formation of polymer impact boards 31 of a thickness dimension which is less than the wooden deck boards 26, however, is not critical for most loads since the load weight will tend to cause full engagement of the load with the load-supporting deck, and polymer deck boards 31 will increase the total friction of the deck resisting load shifting in all cases except those in which the load would actually be lifted off of the wooden deck boards 26.

Figure 4:
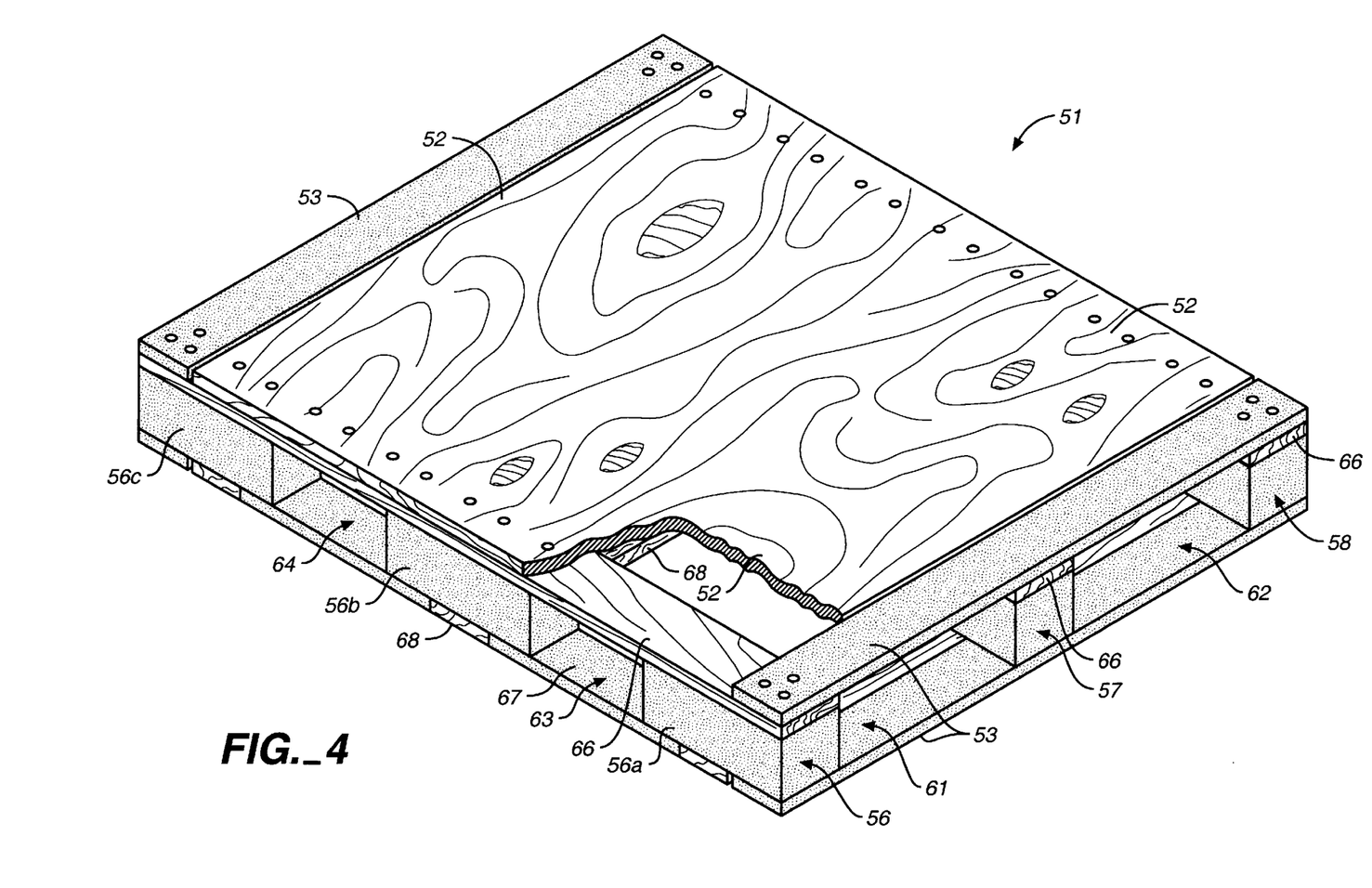
FIG. 4 is a top perspective view of an alternative embodiment of the pallet assembly of the present invention suitable for lifting from the ends and sides of the pallet.
Figure 5:
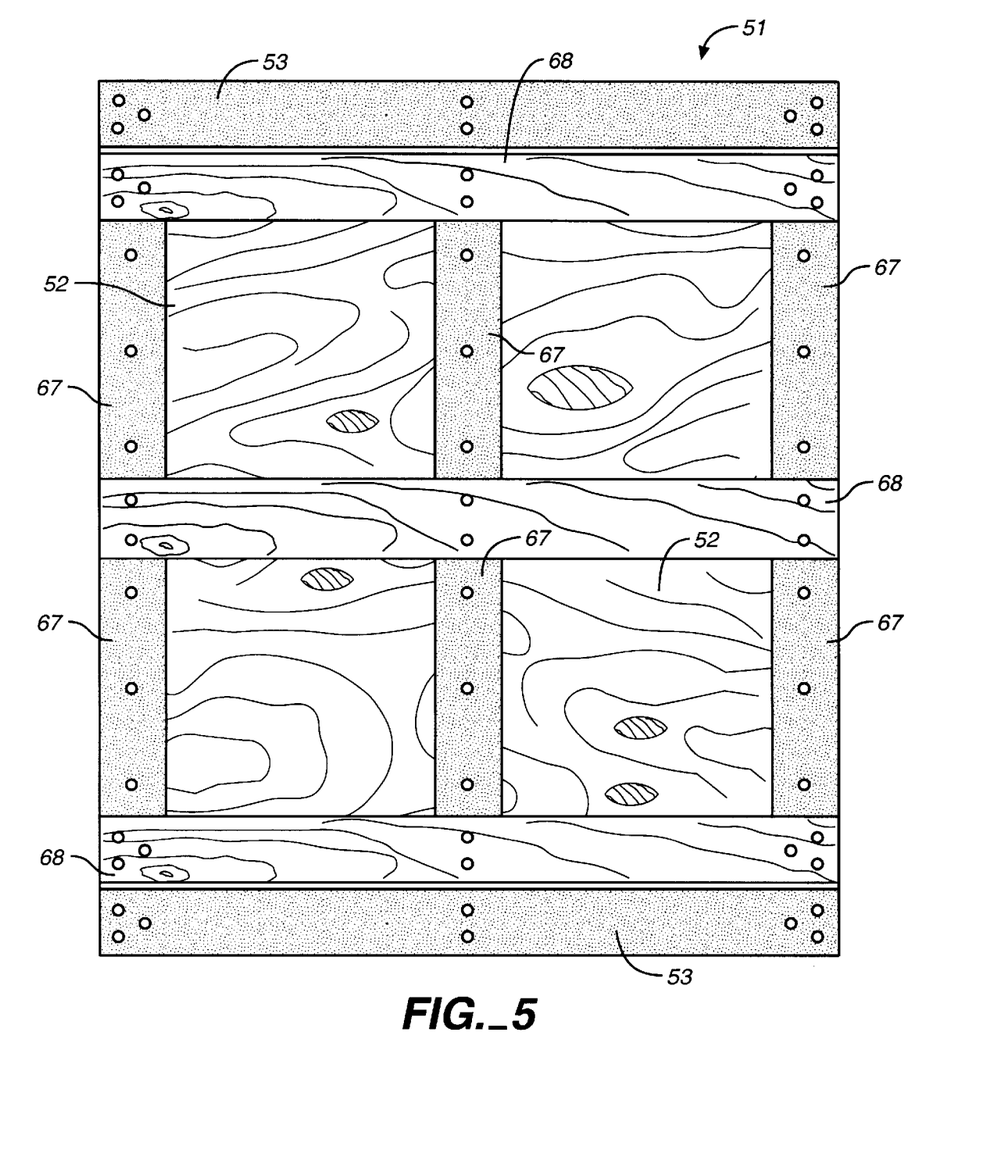
FIG. 5 is a bottom plan view of the pallet assembly of FIG. 4.

Turning now to FIGS. 4 and 5, a composite forklift pallet assembly, generally designated 51, is shown which is suitable for lifting by a lifting device from the sides of the pallet, as well as the front and rear ends. Pallet 51 includes a wooden deck which is provided by a continuous wooden sheet, for example, a sheet 52 of plywood. Obviously, such a sheet of plywood could also have been used in the pallet assembly of FIGS. 1–3. Plywood decking actually increases the overall pallet strength over the use of individual wooden deck boards 26, but it also increases the pallet cost.

As was the case for pallet assembly 21, pallet 51 includes leading edge impact-resistant polymer deck boards 53 which are preferably secured to both the upper and lower facing surfaces of fore-to-aft rail assemblies 56, 57 and 58. Thus, the tine entry channels 61 and 62 of pallet 51 again are substantially surrounded and defined by high-impact polymer members, namely, polymer rail members 56, 57 and 58 and polymer deck boards 53 at both the front and rear ends of pallet 51. Wooden deck 52 provides a high-friction load-supporting surface, while the opposite, leading edge, polymer deck boards 53 and polymer rail assemblies 56–58, resist damage during pallet handling.

In order to enable lifting of pallet 51 from either side, it is preferable that the rail assemblies 56, 57 and 58 each be formed by a plurality of longitudinally spaced rail blocks, such as blocks 56a, 56b and 56c, which are in substantially longitudinally aligned relation. As will be seen, therefore, rail block 56a and rail block 56b define a tined-receiving channel 63 in a side of pallet 51, while blocks 56b and 56c define a second tine-receiving channel 64 in the side of the pallet.

The tine-receiving channels 63 and 64 of pallet 51 extend transversely through pallet assembly 51 since each of rail assemblies 57 and 58 can be constructed as shown for rail assembly 56. Thus, a lifting device can lift pallet 51 from the front, rear or either of the sides. As will be understood, still other forms of four-way entry rail assemblies can be provided including a continuous plastic rail assembly (not shown) having transverse tine-receiving channels 63 and 64.

As used herein, therefore, the expression "rail assembly" shall include a single member or an assembly of components on which the load-supporting pallet deck is secured. A rail assembly can be provided by a single wood or polymer member; by a wood or polymer rail having a wooden or polymer rail board mounted to a side thereof and extending longitudinally therealong in abutting relation to the rail member as shown in FIGS. 1–3; a plurality of generally longitudinally aligned rail blocks, as shown in FIGS. 4 and 5, with or without rail boards mounted thereto; and a wood or polymer member having impact resistant polymer end caps mounted on the opposite ends of the rail, as shown in FIGS. 6 and 7.

As was the case for pallet 21 of FIGS. 1–3, most preferably a wooden rail board 66 in pallet 51 of FIGS. 4 and 5 is mounted on top of polymer rail members 56, 57 and 58 to provide longitudinal rigidity, as well as facilitating nailing of the decking to the polymer rail members. In FIG. 5, however, it will be seen that rail boards 67 are preferably polymer rail boards, even though transverse bracing boards 68 of the lower deck are preferably wooden. The polymer rail boards 63 provide impact resistance, particularly against impact from pallet jacks which will tend to hit the lower rail board, rather than upper rail board 66. Upper rail board 66 is wooden so that channels 63 and 64 are not entirely surrounded by high-impact polymer members, but the upper edge of pallet 51 at channels 63 and 64 is provided by a combination of wooden members, namely, rail boards 66 and deck 52.

Figure 6:
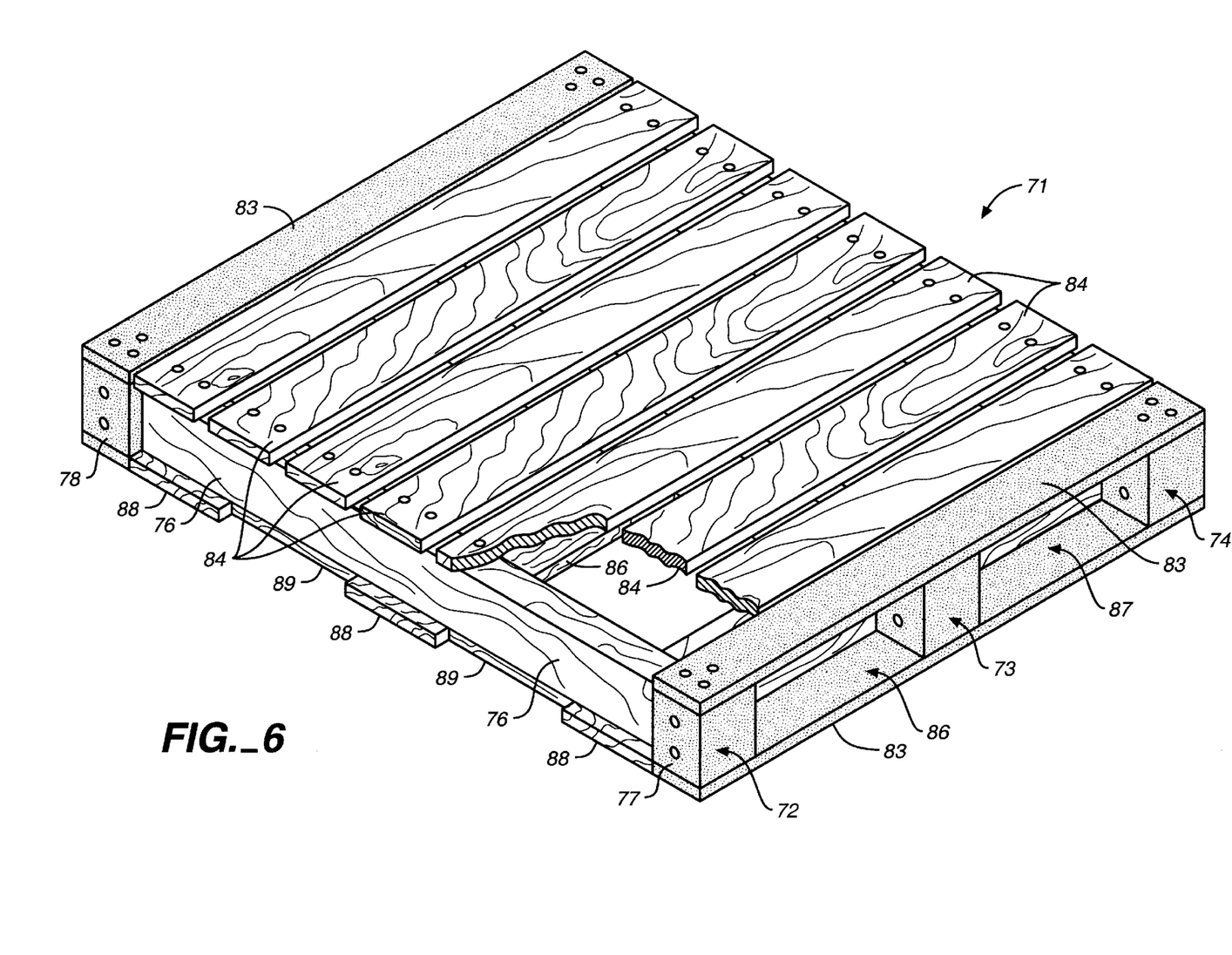
FIG. 6 is a top perspective view of still a further alternative embodiment of the pallet assembly of the present invention.
Figure 7:
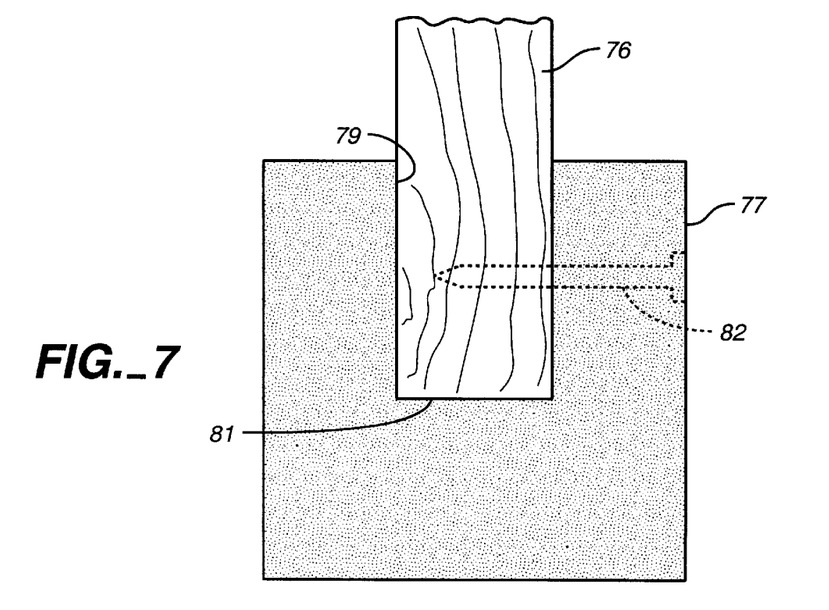
FIG. 7 is an enlarged, fragmentary, top plan view of a rail end of the pallet assembly of FIG. 6.

Still a further alternative embodiment of the pallet assembly of the present invention is shown in FIGS. 6 and 7. Pallet 71 includes a plurality of rail assemblies generally designated 72, 73 and 74. Each of the rail assemblies is constructed from a wooden rail member 76 having high-impact polymer end caps 77 and 78 mounted thereto. As will be seen from FIG. 7, the high-impact polymer end caps 77 preferably have a U-shaped cross section defining a channel 79 dimensioned to snugly receive end 81 of wooden rail member 76. End caps 77 and 78 can be held on rail member 76 by a transverse fastener, such as nail 82, or through the use of adhesives. Again, pallet 71 includes leading edge polymer impact-resistant deck boards 83 and a wooden deck, here provided by a plurality of wooden deck boards 84. Thus, the tine-receiving channels 86 and 87 are defined by high-impact polymer end caps on the rail assemblies and leading edge polymer deck boards.

The construction of pallet 71 is the same at both the front and rear of the pallet assembly, and pallet 71 is not designed for four-way lifting. The bottom bracing of pallet 71 can be provided by transverse wooden bracing members 88 and longitudinal rail boards 89 in the manner similar to that of pallet 21.

Pallet 71 has a high-friction wooden surface and yet it also has impact-resistant polymer forklift tine channels. The use of wooden rails 76 and polymer end caps 77 and 78 reduces the overall weight and cost of the pallet, although the wooden rails 76 inwardly of the end caps are somewhat more vulnerable than plastic rails to angular gouging by the forklift tine ends during handling.

As will be understood from the above description of the pallet structure of the present invention, the method of forming a pallet assembly of the present invention is comprised of the steps of securing a wooden deck to an upwardly facing side of a plurality of side-by-side, spaced-apart rail assemblies, and mounting an impact-resistant polymer deck board to an upwardly facing side of the rail assemblies at leading edges of opposite ends of the pallet assembly. Most preferably, impact-resistant polymer ends are provided on the pallet on the rail assemblies. In the first two embodiments the impact-resistant polymer ends were provided by forming the rail assemblies as polymer members, while in the embodiment of FIGS. 6 and 7, polymer end caps were provided having a sufficient thickness dimension so as to resist impact failures. When polyethylene is used, end caps 77 and 78 can have an axial thickness of at least one-half inch and preferably at least about one inch.

The method of the present invention also preferably includes a step of nailing the wood and polymer deck boards to the rail assemblies using automatic nailing machines. As shown in the figures, for example, nails 91 can be driven through the upper deck members, whether plastic or wood, and then through the wooden rail board 27 and into the polymer rail members 22, 23 and 24. Preferably, nails 91 are provided by either ring shank or drive screw nails, with ring shank nails being the most preferred. A ring shank nail can be driven by an automatic nailing machine mounted on a movable gantry in rapid succession as the nailing machine is moved along the rails. As the nailing machine is advanced along the pallet rail, however, the pressure available to drive nails 91 will begin to drop due to the rapid succession with which the nails are being driven. If polymer impact deck boards 31 are placed directly on polymer rail member 22, for example, more nailing energy is required of the nailing machine than when a wooden rail board 27 is interposed therebetween. Thus, the presence of wood rail board 27 on top of polymer rail member 22 allows higher automatic nailing speed as the nailing machine moves longitudinally along the rails and drives nails 91.

An advantage of securing decking to polymer rail members using ring shank nails is that the boards have as much as fifty percent greater resistance to being pulled out upon lifting of a board by the forklift tines than all wooden pallets.

The composite wood and polymer forklift pallet of the present invention can be manufactured out of a number of different plastic and wood combinations. Polyethylene is particularly well suited for this application because of its wide availability and suitability for recycling. Thus, there is a considerable over-supply of polyethylene plastic that can be recycled for applications which do not require new plastic. The polymer rails and impact-resistant deck boards of the present invention do not require virgin plastics, and they are very amenable to the use of recycled polyethylene. A further important advantage is that the resulting pallets themselves can be recycled. Thus, polymer rails and deck boards, which are damaged eventually through use, can be ground down and recycled for use again as deck boards and rails.

Similarly, wooden members which are not destroyed during use can be used in the remanufacture of additional pallets or ground down and used as extender for the polyethylene.

Four-way entry, block-style pallets constructed as shown in FIGS. 4 and 5, but with a wooden deck as shown in FIG. 1, have been tested at test facilities which simulate use of the pallets in a typical grocery or dry goods operation. The test simulates palletizing, shipping, transporting, receiving and three types of storage, namely, static rack, flow rack and block stacking. A 3,000 pound capacity forklift was used and the number of cycles or grocery industry round trips were measured. After 100 cycles the pallet exhibited only minor dents on the rail and plastic deck boards from the forklift tines and minor wood splits and minor sections of missing wood. No significant structural damage occurred after 100 cycles in the test. This would compare, for example, to the occurrence of significant damage to a wooden forklift pallet assembly after only five cycles.

The composite polymer and wood forklift pallet assembly and method of the present invention, therefore, afford a highly durable pallet. While pallet cost is increased, the pallet life is increased many times more so that the cost per use cycle is reduced. The load-supporting surface, moreover, has all of the attributes of a high-friction wooden decking so that loads do not shift during normal pallet use. The tine-receiving channels of the pallets are essentially defined by high-impact polymers, while the desirable rigidity, low-cost and high friction surfaces are provided by wooden members.

What is claimed is:

1. A pallet assembly comprising:

a plurality of side-by-side, spaced apart rail assemblies extending from a front to a rear of said pallet assembly;

a wooden deck secured to an upwardly facing side of said rail assemblies and extending transversely across said rail assemblies to provide an upwardly facing, wooden, load support surface;

said rail assemblies having a height sufficient to enable the tines of a lifting device to pass under said wooden deck for lifting of said pallet assembly; and an impact-resistant polymer deck board secured to said rail assemblies at at least one of said front and said rear of said pallet assembly longitudinally along said rail assemblies outwardly of said wooden deck to shield said wooden deck from impact by said lifting device during lifting of said pallet assembly.

2. The assembly as defined in claim 1, and a lower deck secured to a downwardly facing side of said rail assemblies and extending transversely thereto; and wherein, said rail assemblies and said wooden deck and said lower deck define a pair of fore-and-aft extending tine-receiving channels for lifting of said pallet assembly using a lifting device; and said wooden deck, said lower deck and said rail assemblies being substantially entirely formed of impact-resistant polymer members defining the entrances to said tine-receiving channels.

3. The composite pallet assembly as defined in claim 2 wherein, said upper deck and said lower deck each include polymer deck boards secured to said rail assemblies at each end of said rail assemblies; and said rail assemblies are formed of a polymer material at opposite ends thereof.

4. The composite pallet assembly as defined in claim 3 wherein, said rail assemblies are provided by one of:

(a) impact-resistant polymer rail members; and (b) a wooden member having impact-resistant polymer end caps.

5. The pallet assembly as defined in claim 4 wherein, said rail assemblies are provided by a single longitudinally extending, impact-resistant plastic member having a wooden rail board mounted on top of said plastic member; and said upper deck is provided by at least one wooden deck board and an impact-resistant plastic deck board positioned at opposite leading edges of said pallet assembly above the entrance to each tine-receiving channel.

6. The pallet assembly as defined in claim 1 wherein, said rail assemblies are formed with side channels for receipt of the tines of a lifting device from opposite sides of said pallet assembly.

7. The pallet assembly as defined in claim 6 wherein, said rail assemblies are provided by a plurality of polymer rail blocks mounted in substantially aligned relation and spaced apart to define the tine-receiving channels.

8. The pallet assembly as defined in claim 1 wherein, said rail assemblies are made from rigid impact-resistant polymer members.

9. The pallet assembly as defined in claim 8, and wooden rail boards extending substantially over the length of said rail assemblies and mounted between said upwardly facing side of said rail assemblies and said wooden deck and said polymer deck board, said wooden deck and said polymer deck board being secured to said rail assemblies by a plurality of nails extending through said wooden deck and said polymer deck board, through said wooden rail boards and into said polymer members.

10. The pallet assembly as defined in claim 8 wherein, said polymer deck board and said rail assemblies are both formed from a polyethylene material.

11. The pallet assembly as defined in claim 10 wherein, said polyethylene material includes recycled polyethylene plastic material.

12. The pallet assembly as defined in claim 11 wherein, said recycled polyethylene plastic includes at least 10 percent by weight of wood particles.

13. The pallet assembly as defined in claim 1 wherein, at least one of said rail assemblies provided by a wooden rail member and an impact-resistant polymer end cap mounted on opposed ends of said wooden rail member.

14. The pallet assembly as defined in claim 13 wherein, the polymer end caps are formed from a plastic and have a U-shaped cross section defining a channel dimensioned to receive said opposite ends of said wooden rail member.

15. The pallet assembly as defined in claim 1 wherein, said wooden deck is provided by a continuous wooden sheet.

16. A pallet assembly comprising:

a plurality of side-by-side, spaced apart rail assemblies extending from a front to a rear of said pallet assembly;

a wooden deck secured to an upwardly facing side of said rail assemblies and extending transversely across said rail assemblies to provide an upwardly facing, wooden, load support surface;

said rail assemblies having a height sufficient to enable the tines of a lifting device to pass under said wooden deck from a front and from a rear of said pallet assembly for lifting of said pallet assembly;

impact-resistant polymer deck boards secured to said rail assemblies and extending transversely there across at both said front and said rear of said pallet assembly longitudinally along said rail assemblies outwardly of said wooden deck to shield said wooden deck from impact by said lifting device during lifting of said pallet assembly;

a plurality of transverse wooden boards secured to a downwardly facing side of said rail assemblies and extending across said rail assemblies in vertically spaced relation to said wooden deck for receipt of said forklift tines between said wooden deck and said wooden boards; and impact-resistant polymer deck boards secured to said rail assemblies on said downwardly facing side thereof longitudinally outwardly of said transverse wooden boards proximate said front and proximate said rear of said pallet assembly.

17. A pallet assembly comprising:

a plurality of side-by-side, spaced apart rail assemblies extending from a front to a rear of said pallet assembly;

a wooden deck secured to an upwardly facing side of said rail assemblies and extending transversely across said rail assemblies to provide an upwardly facing, wooden, load support surface;

said rail assemblies having a height sufficient to enable the tines of a lifting device to pass under said wooden deck from said front and said rear of said pallet assembly for lifting of said pallet assembly; and impact-resistant polymer deck boards secured to said rail assemblies at both said front and said rear of said pallet assembly longitudinally along said rail assemblies outwardly of said wooden deck to shield said wooden deck from impact by said lifting device during lifting of said pallet assembly, said polymer deck boards each have a height dimension less than a height dimension of said wooden deck.

* * * * *